United States Patent
Ikeno

(10) Patent No.: US 10,866,130 B2
(45) Date of Patent: Dec. 15, 2020

(54) FLOW SENSOR

(71) Applicant: KOA CORPORATION, Nagano (JP)

(72) Inventor: Tomokazu Ikeno, Nagano (JP)

(73) Assignee: KOA CORPORATION, Nagano (JP)

( * ) Notice: Subject to any disclaimer, the term of this patent is extended or adjusted under 35 U.S.C. 154(b) by 207 days.

(21) Appl. No.: 16/095,836

(22) PCT Filed: Feb. 27, 2017

(86) PCT No.: PCT/JP2017/007546
§ 371 (c)(1),
(2) Date: Oct. 23, 2018

(87) PCT Pub. No.: WO2017/187757
PCT Pub. Date: Nov. 2, 2017

(65) Prior Publication Data
US 2019/0170556 A1 Jun. 6, 2019

(30) Foreign Application Priority Data
Apr. 26, 2016 (JP) .................. 2016-088070

(51) Int. Cl.
*G01F 15/02* (2006.01)
*G01P 5/12* (2006.01)
*G01F 1/698* (2006.01)
*G01F 1/696* (2006.01)

(52) U.S. Cl.
CPC ............ *G01F 15/022* (2013.01); *G01F 1/696* (2013.01); *G01F 1/698* (2013.01); *G01P 5/12* (2013.01)

(58) Field of Classification Search
CPC ........ G01F 15/022; G01F 1/698; G01F 1/696; G01P 5/12

USPC ....................................... 73/204.19
See application file for complete search history.

(56) References Cited

U.S. PATENT DOCUMENTS

| | | |
|---|---|---|
| 5,094,246 A | 3/1992 | Rusz et al. |
| 5,230,331 A | 7/1993 | Rusz et al. |
| 2014/0190251 A1 | 7/2014 | Huang et al. |
| 2018/0283919 A1 | 10/2018 | Ikeno |

FOREIGN PATENT DOCUMENTS

| | | | |
|---|---|---|---|
| JP | H0953967 A | * | 8/1995 |
| JP | 8-35978 A | | 2/1996 |
| JP | 9-53967 A | | 2/1997 |
| JP | 2000-28411 A | | 1/2000 |
| JP | 2017-67724 A | | 4/2017 |

OTHER PUBLICATIONS

International Search Report in International Patent Application No. PCT/JP2017/007546, dated May 23, 2017.

* cited by examiner

*Primary Examiner* — Tarun Sinha
(74) *Attorney, Agent, or Firm* — Greenblum & Bernstein, P.L.C.

(57) ABSTRACT

To provide a flow sensor having improved responsiveness compared to the prior art, the flow sensor of the present invention includes an insulation board, a flow-rate detection resistance element, and a temperature compensation resistance element. Each of the flow-rate detection resistance element and the temperature compensation resistance element is arranged on the insulation board such that a terminal temperature of the temperature compensation resistance element approaches a terminal temperature of the flow-rate detection resistance element. Accordingly, responsiveness can be improved.

6 Claims, 11 Drawing Sheets

FLOW SENSOR

FIELD OF THE INVENTION

This invention relates to, for example, a flow sensor capable of measuring a wind velocity.

BACKGROUND OF THE INVENTION

There is known a thermal flow sensor for detecting a flow rate of fluid on the basis of a heat radiation effect by exposing a heated flow-rate detection resistance element to the fluid. Here, in order to suppress influence of a temperature change of the fluid, the thermal flow sensor performs temperature compensation by providing a temperature compensation resistance element capable of detecting a temperature of the fluid itself separately from the flow-rate detection resistance element. For example, the flow-rate detection resistance element and the temperature compensation resistance element are arranged on the same insulation board (see Patent Document 1).

CITATION LIST

Patent Documents

Patent Document: JP-A-8-35978

SUMMARY OF THE INVENTION

However, when there is a difference between a terminal temperature of the flow-rate detection resistance element and a terminal temperature of the temperature compensation resistance element due to a thermal resistance between the flow-rate detection resistance element and the temperature compensation resistance element, responsiveness of the flow sensor is determined by a thermal time constant based on a heat capacity in a region having the temperature difference. That is, as a thermal time constant between the flow-rate detection resistance element and the temperature compensation resistance element increases, the responsiveness decreases.

In the technique of Patent Document 1, both resistance elements are arranged on the same board while they are thermally separated. In this configuration, a terminal temperature difference between both resistance elements increases, and a thermal time constant between the flow-rate detection resistance element and the temperature compensation resistance element increases. Therefore, it is difficult to improve the responsiveness.

In view of the aforementioned problems, it is therefore an object of the present invention to provide a flow sensor capable of providing improved responsiveness compared to the prior art.

According to an aspect of the invention, there is provided a flow sensor including: an insulation board; a flow-rate detection resistance element; and a temperature compensation resistance element, wherein each of the flow-rate detection resistance element and the temperature compensation resistance element is arranged on the insulation board such that a terminal temperature of the temperature compensation resistance element approaches a terminal temperature of the flow-rate detection resistance element.

According to another aspect of the invention, there is provided a flow sensor including: an insulation board; a flow-rate detection resistance element; and a temperature compensation resistance element, wherein the flow-rate detection resistance element is arranged on a front face side of the insulation board, and the temperature compensation resistance element is arranged on a back face side of the insulation board oppositely to the flow-rate detection resistance element by interposing the insulation board.

Using the flow sensor according to the present invention, it is possible to reduce a thermal time constant between both resistance elements and improve responsiveness.

BRIEF DESCRIPTION OF DRAWINGS

FIGS. 8A and 8B illustrate a flow sensor according to another embodiment of the invention different from that of FIGS. 1 and 2, in which FIG. 8A is a plan view, and FIG. 8B is a cross-sectional view taken along a line C-C of FIG. 8A;

DESCRIPTION OF EMBODIMENTS

A best mode for embodying the present invention (hereinafter, referred to as an "embodiment") will now be described in details. Note that the invention is not limited to the following embodiment, but various modifications may be possible within the scope of the invention.

Figure 1:
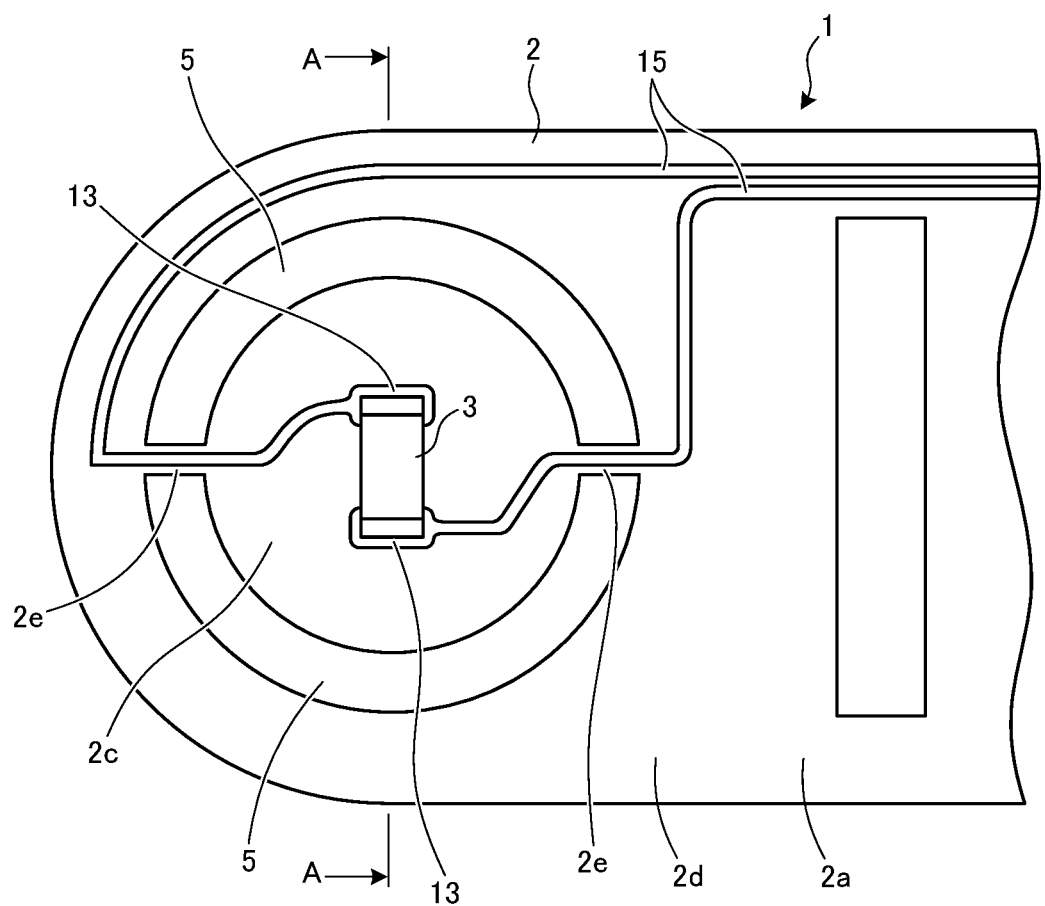
FIG. 1 is a partial plan view illustrating a flow sensor according to an embodiment of the invention.
Figure 2:
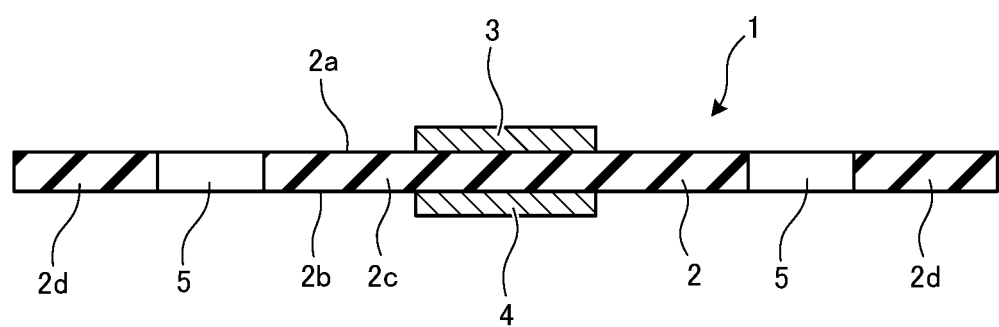
FIG. 2 is a cross-sectional view taken along a line A-A of the flow sensor of FIG. 1.

FIG. 1 is a partial plan view illustrating the flow sensor according to an embodiment of the invention. FIG. 2 is a cross-sectional view taken along a line A-A of the flow sensor of FIG. 1.

A flow sensor 1 according to this embodiment illustrated in FIGS. 1 and 2 is a thermal flow sensor 1 including an insulation board 2, and a flow-rate detection resistance element 3 and a temperature compensation resistance element 4 arranged on the insulation board 2. Note that the temperature compensation resistance element 4 arranged on the back face of the insulation board 2 is not illustrated in FIG. 1 for simplicity purposes.

As the insulation board 2, a typical printed circuit board obtained by impregnating a glass cloth with epoxy resin may be preferably employed without a particular limitation. For example, a FR-4 board may be employed.

As illustrated in FIG. 2, the flow-rate detection resistance element 3 is arranged on the front face 2a of the insulation board 2. In addition, as illustrated in FIG. 2, the temperature compensation resistance element 4 is placed on the back face 2b of the insulation board 2.

The flow-rate detection resistance element 3 is a heat-radiating resistor, for example, controlled to be heated to a predetermined temperature higher than an atmospheric temperature set arbitrarily. For this reason, the temperature of the flow-rate detection resistance element 3 decreases as the fluid makes contact with the flow-rate detection resistance element 3. The flow sensor 1 according to this embodiment detects a flow rate (flow velocity) of the fluid using the heat radiated from the flow-rate detection resistance element 3.

The flow sensor 1 according to this embodiment compensates for influence of a temperature change of the fluid by detecting a temperature of the fluid itself using the temperature compensation resistance element 4. In this manner, by arranging the temperature compensation resistance element 4 in the flow sensor 1, it is possible to reduce influence on detection of the flow rate from a temperature change of the fluid. Therefore, it is possible to detect the flow rate with high accuracy.

As illustrated in FIGS. 1 and 2, the insulation board 2 has an element mount portion 2c, a support portion 2d separated from the element mount portion 2c by interposing a slit 5, and a narrow-width connecting portion 2e configured to connect the element mount portion 2c and the support portion 2d to each other (refer to FIG. 1). A signal processing unit (integrated circuit: IC) (not shown) is mounted on the support portion 2d. The flow-rate detection resistance element 3 and the temperature compensation resistance element 4 are electrically connected to the signal processing unit. The support portion 2d surrounds the element mount portion 2c without a gap. Alternatively, a gap may be interposed therebetween. However, if the element mount portion 2c is surrounded by the support portion 2d without a gap, it is possible to reinforce a mechanical strength of the element mount portion 2c.

As illustrated in FIGS. 1 and 2, the flow-rate detection resistance element 3 and the temperature compensation resistance element 4 are arranged on the front face 2a and the back face 2b, respectively, inside the element mount portion 2c.

Here, a width (diameter) of the element mount portion 2c is set to, for example, several millimeters to 10 mm, and a width of the connecting portion 2e is set to, for example, a fraction of up to 10% of the width (diameter) of the element mount portion 2c. In addition, a thickness of the insulation board 2 is set to, for example, 1 mm or smaller. However, the numerical values described above are just for exemplary purposes, and are not intended to limit the size or thickness of each part in this embodiment.

Figure 3:
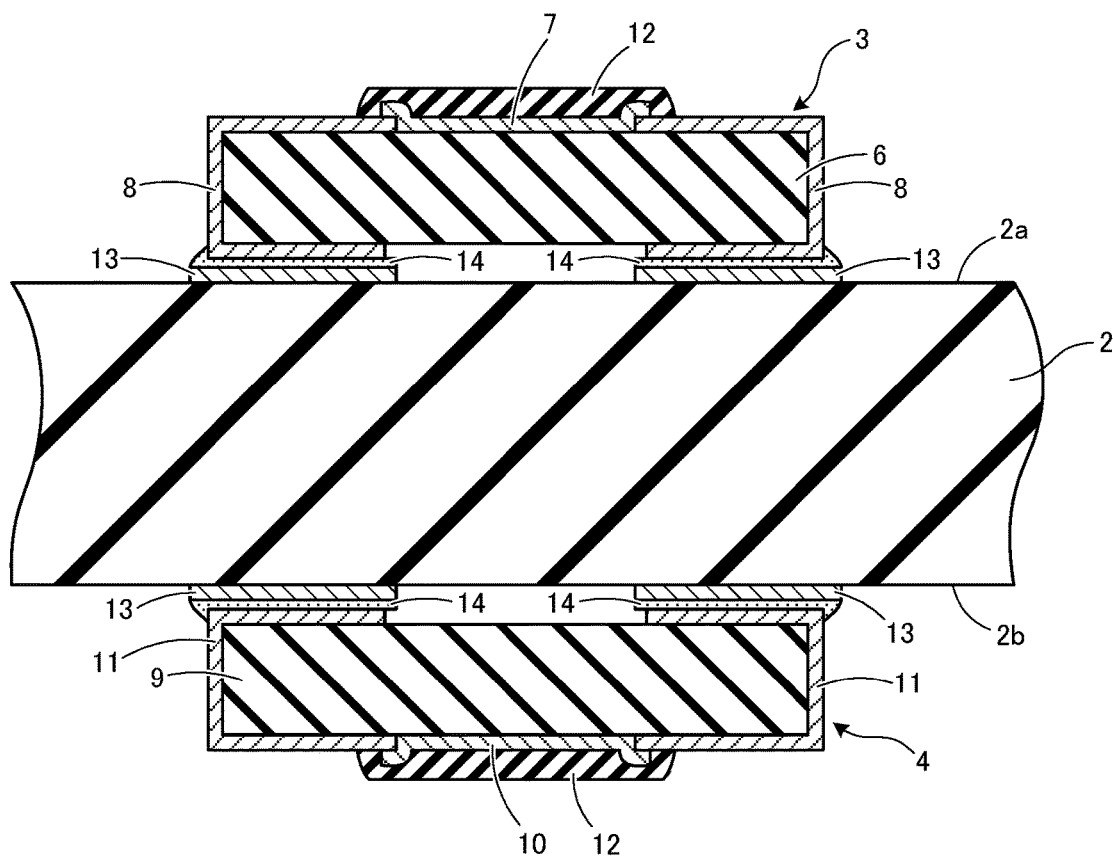
FIG. 3 is a partial enlarged cross-sectional view illustrating the flow sensor of FIG. 2.

Structures of the flow-rate detection resistance element 3 and the temperature compensation resistance element 4 will be described with reference to FIG. 3. FIG. 3 is a partial enlarged cross-sectional view illustrating the flow sensor of FIG. 2.

As illustrated in FIG. 3, the flow-rate detection resistance element 3 and the temperature compensation resistance element 4 are chip type resistors. As illustrated in FIG. 3, the flow-rate detection resistance element 3 has a ceramic substrate 6, a resistor layer 7 formed on a front face of the ceramic substrate 6, and a terminal 8 electrically connected to the resistor layer 7 and provided on the front face of the ceramic substrate 6. As illustrated in FIG. 3, the terminal 8 is formed on both side faces of the ceramic substrate 6 and extends up to a back face position facing the insulation board 2 beyond the side faces from the position electrically connected to the resistor layer 7. Similarly, the temperature compensation resistance element 4 also has a ceramic substrate 9, a resistor layer 10 formed on the front face of the ceramic substrate 9, and a terminal 11 electrically connected to the resistor layer 10 and provided on the front face of the ceramic substrate 9. As illustrated in FIG. 3, front faces of the resistor layers 7 and 10 of the flow-rate detection resistance element 3 and the temperature compensation resistance element 4, respectively, are covered by a protection layer 12.

As illustrated in FIG. 3, the flow-rate detection resistance element 3 is surface-mounted in a part of the terminal 8 on a land 13 formed on the front face 2a of the insulation board 2 by interposing a solder layer 14. Similarly, the temperature compensation resistance element 4 is surface-mounted in a part of the terminal 11 on a land 13 formed on the back face 2b of the insulation board 2 by interposing a solder layer 14.

As illustrated in FIG. 1, the wiring pattern 15 extends from the land 13 of the element mount portion 2c to the support portion 2d on the front face 2a of the insulation board 2. Similarly, the wiring pattern 15 extends from the land 13 on the back face 2b although not shown in the drawings. In addition, each wiring pattern 15 is connected to the signal processing unit provided in the support portion 2d.

Figure 4:
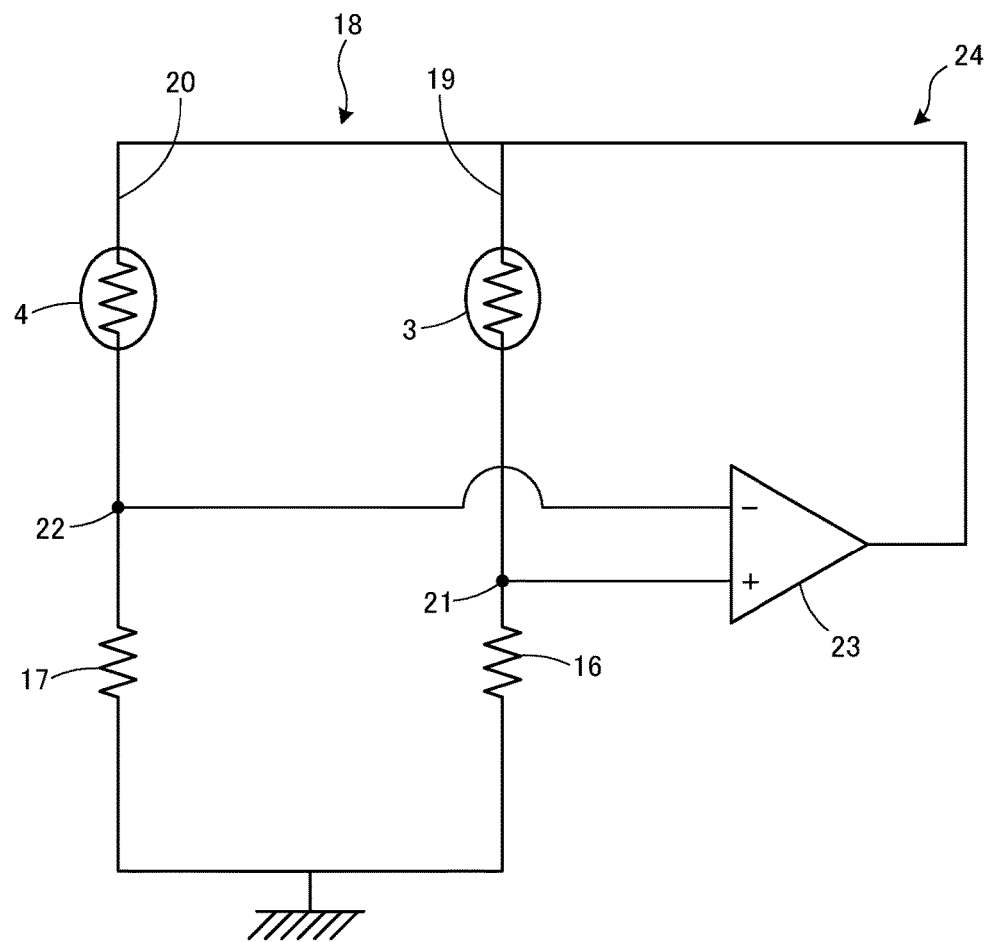
FIG. 4 is a circuit diagram illustrating a flow sensor according to an embodiment of the invention.

FIG. 4 is a circuit diagram illustrating the flow sensor according to this embodiment. As illustrated in FIG. 4, the flow-rate detection resistance element 3, the temperature compensation resistance element 4, and the resistors 16 and 17 constitute a bridge circuit 18. As illustrated in FIG. 4, the flow-rate detection resistance element 3 and the resistor 16 constitute a first series circuit 19, and the temperature compensation resistance element 4 and the resistor 17 constitute a second series circuit 20. In addition, the first and second series circuits 19 and 20 are connected in parallel to form the bridge circuit 18.

As illustrated in FIG. 4, an output portion 21 of the first series circuit 19 and an output portion 22 of the second series circuit 20 are connected to a differential amplifier (amp) 23, respectively. A feedback circuit 24 including the differential amplifier 23 is connected to the bridge circuit 18. The feedback circuit 24 includes a transistor (not shown) or the like.

The resistors 16 and 17 have temperature coefficients of resistance (TCR) smaller than those of the flow-rate detection resistance element 3 and the temperature compensation resistance element 4. The flow-rate detection resistance element 3 has a predetermined resistance value Rs1, for example, in a heated state having a temperature higher than a predetermined atmospheric temperature by a predetermined level. In addition, the temperature compensation resistance element 4 is controlled, for example, to have a predetermined resistance value Rs2 at the aforementioned atmospheric temperature. Note that the resistance value Rs1 is lower than the resistance value Rs2. For example, the resistance value Rs2 is set to several times to several tens times of the resistance value Rs1, but not limited thereto. The resistor 16 that constitutes the first series circuit 19 along with the flow-rate detection resistance element 3 is a fixed resistor, for example, having the same resistance value R1 as the resistance value Rs1 of the flow-rate detection resistance element 3. Furthermore, the resistor 17 that constitutes the second series circuit 20 along with the temperature compensation resistance element 4 is a fixed resistor, for example, having the same resistance value R2 as the resistance value Rs2 of the temperature compensation resistance element 4.

The flow sensor 1 according to this embodiment is, for example, a wind velocity sensor. In a windless state, a differential output from the differential amplifier 23 is controlled to nearly zero. If wind blows in the windless state, a temperature of the flow-rate detection resistance element 3 as a heat-radiating resistor decreases. Therefore, an electric potential of an output portion 21 of the first series circuit 19 connected to the flow-rate detection resistance element 3 varies. As a result, it is possible to obtain a differential output using the differential amplifier 23. In addition, the feedback circuit 24 applies a driving voltage to the flow-rate detection resistance element 3 on the basis of the differential output. The flow sensor 1 can calculate a wind velocity on the basis of a voltage change necessary to heat the flow-rate detection resistance element 3 and output it. As the wind velocity varies, the temperature of the flow-rate detection resistance element 3 changes. Therefore, it is possible to detect the wind velocity.

In this manner, a wind velocity can be detected using the flow sensor 1 according to this embodiment. For example, an application capable of changing color or brightness of a light emitting diode (LED) on the basis of a change of the wind velocity may be provided. The application based on the flow sensor 1 according to this embodiment may be employed, for example, in an IOT-based sensor network.

The flow sensor 1 according to this embodiment is characterized in that the flow-rate detection resistance element 3 and the temperature compensation resistance element 4 are arranged on the insulation board 2 such that a temperature of the terminal 11 of the temperature compensation resistance element 4 (hereinafter, referred to as a "terminal temperature") approaches a temperature of the terminal 8 of the flow-rate detection resistance element 3 (hereinafter, referred to as a "terminal temperature"). Here, the word "approach" means that a slight difference between the terminal temperatures of both resistance elements is allowable. The "slight difference of the terminal temperature" refers to, for example, a state in which the terminal temperature difference is smaller than that of a comparative example described below. Specifically, the terminal temperature difference of the flow sensor 1 according to this embodiment is preferably set to 5° C. or smaller and more preferably approximately 3° C. or smaller, but not limited thereto.

According to this embodiment, the flow-rate detection resistance element 3 and the temperature compensation resistance element 4 of the flow sensor 1 are arranged with respect to the insulation board 2 as described blow. As a result, it is possible to reduce the terminal temperature difference between the flow-rate detection resistance element 3 and the temperature compensation resistance element 4 as small as possible.

That is, according to this embodiment, as illustrated in FIGS. 2 and 3, the flow-rate detection resistance element 3 and the temperature compensation resistance element 4 are arranged oppositely on the insulation board 2. Here, the phrase "arranged oppositely" includes a case where the flow-rate detection resistance element 3 and the temperature compensation resistance element 4 are arranged to overlap with each other at least in a part by interposing the insulation board 2 and laterally deviating from each other with respect to the insulation board 2 as well as a case where the temperature compensation resistance element 4 is arranged right under the flow-rate detection resistance element 3. In this case, the terminal 8 of the flow-rate detection resistance element 3 and the terminal 11 of the temperature compensation resistance element 4 are preferably arranged to partially overlap with each other by interposing the insulation board 2.

The responsiveness of the flow sensor 1 is determined by a thermal time constant based on a heat capacity of a region having a temperature difference generated between the terminal temperature of the flow-rate detection resistance element 3 and the terminal temperature of the temperature compensation resistance element 4 due to a thermal resistance between the flow-rate detection resistance element 3 and the temperature compensation resistance element 4. Therefore, in order to improve the responsiveness of the flow sensor 1, the flow-rate detection resistance element 3 and the temperature compensation resistance element 4 are arranged on the insulation board 2 such that the thermal time constant between both resistance elements is reduced according to this embodiment.

Specifically, according to this embodiment, as illustrated in FIG. 2, the flow-rate detection resistance element 3 and the temperature compensation resistance element 4 are arranged oppositely on the insulation board 2. As a result, it is possible to reduce a thermal resistance between both resistance elements and allow the terminal temperature of the temperature compensation resistance element 4 to approach the terminal temperature of the flow-rate detection resistance element 3. In addition, the insulation board 2 interposed between both resistance elements has a thin thickness and a small heat capacity. As a result, it is possible to reduce the heat capacity of the insulation board 2 interposed between both resistance elements and the thermal time constant determined by the thermal resistance between both resistance elements. Therefore, it is possible to improve responsiveness. Furthermore, since the heat capacity of the insulation board 2 interposed between both resistance elements is small, it is possible to reduce power consumption.

In this manner, according to this embodiment, the responsiveness is improved. Therefore, it is possible to maintain excellent responsiveness even when the heat capacity of the resistance element increases by applying a weather resistance coat or the like. Therefore, according to this embodiment, it is possible to provide an airflow sensor 1 having excellent responsiveness in a field requiring weather resistance such as an outdoor environment.

In the flow sensor 1 according to this embodiment, the flow-rate detection resistance element 3 is arranged on the front face 2a side of the insulation board 2 against wind as illustrated in FIGS. 1 and 2. Meanwhile, the temperature compensation resistance element 4 is arranged on the back face 2b side of the insulation board 2 where wind less collides, compared to the front face 2a. In this manner, the temperature compensation resistance element 4 is arranged such that a contact with wind is obstructed, compared to the flow-rate detection resistance element 3. Since the temperature compensation resistance element 4 is influenced by the heat transferred through the insulation board 2 due to self-heating of the flow-rate detection resistance element 3, the temperature of the temperature compensation resistance element 4 also increases. For this reason, when wind collides with the temperature compensation resistance element 4, the temperature of the temperature compensation resistance element 4 itself is reduced, and a voltage obtained from the output portion 22 of the second series circuit 20 of FIG. 4 changes. This degrades sensitivity. For this reason, it is possible to maintain sensitivity and improve responsiveness by arranging the temperature compensation resistance element 4, for example, on the back face 2b side of the insulation board 2 so as not to collide with wind.

According to this embodiment, the flow-rate detection resistance element 3 and the temperature compensation resistance element 4 constitute a chip type resistor having the structure of FIG. 3. The flow-rate detection resistance element 3 as a heat-radiating resistor emits joule heat from the resistor layer 7. A part of the heat is transferred from the insulation board 2 to the terminal 11 of the temperature compensation resistance element 4 through the ceramic substrate 6 and the terminal 8 of the flow-rate detection resistance element 3. For this reason, the temperature of the resistor layer 7 of the flow-rate detection resistance element 3 is highest, and the temperature gradually decreases through the terminal 11 of the temperature compensation resistance element 4. In this manner, if the chip type resistor is arranged on the insulation board, a temperature difference is naturally generated between the resistor layer 7 and the terminal 8. This temperature difference is caused by a thermal resistance of the ceramic substrate 6 between the resistor layer 7 and the terminal 8. For this reason, if a chip type resistor as the flow-rate detection resistance element 3 and the temperature compensation resistance element 4 is arranged on the insulation board 2, typically, it is difficult to reduce influence on the responsiveness of the flow sensor 1 from the heat capacity caused by the internal thermal resistance of the chip type resistor in addition to the heat capacity of the chip type resistor. That is, by arranging the flow-rate detection resistance element 3 and the temperature compensation resistance element 4 oppositely on the front and back faces of the insulation board 2 and allowing the terminal temperature of the temperature compensation resistance element 4 to approach the terminal temperature of the flow-rate detection resistance element 3, it is possible to suppress an increase of the thermal resistance and an increase of the heat capacity applied between the resistor layer 7 of the flow-rate detection resistance element 3 and the terminal 11 of the temperature compensation resistance element 4 as much as possible. Therefore, it is possible to effectively improve the responsiveness. Furthermore, the chip type resistor employed as the flow-rate detection resistance element 3 and the temperature compensation resistance element 4 can provide desired responsiveness and sensitivity without using an expensive resistor material such as platinum. Accordingly, it is possible to manufacture the flow sensor 1 inexpensively.

Figure 5A:
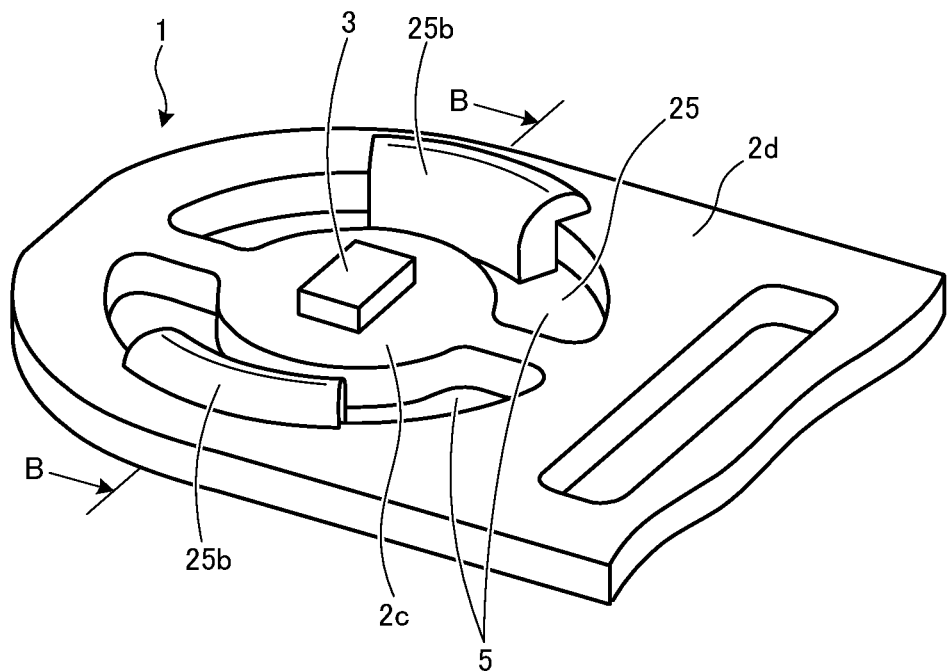
FIGS. 5A and 5B are partial perspective views illustrating a configuration of a flow sensor provided with a lid according to an embodiment of the invention.
Figure 5B:
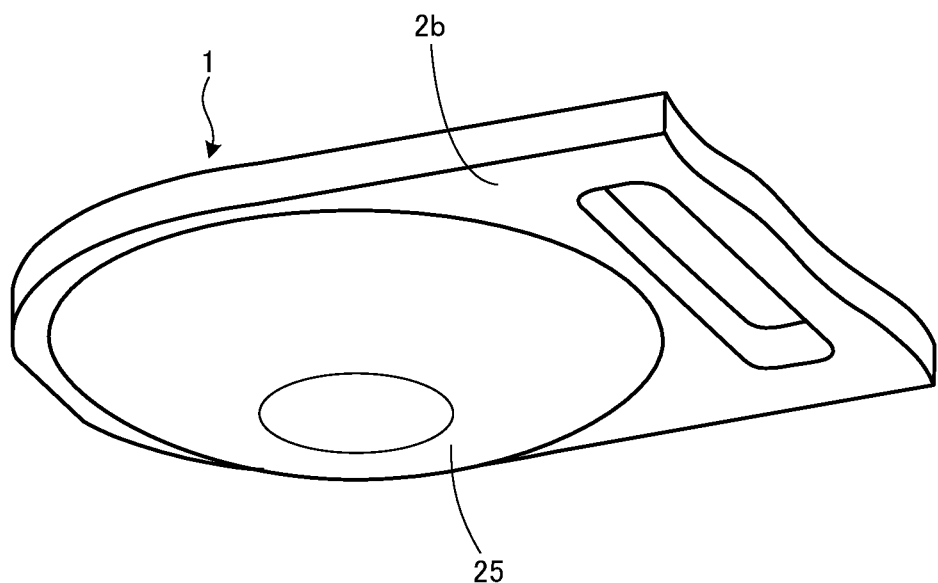
Figure 6:
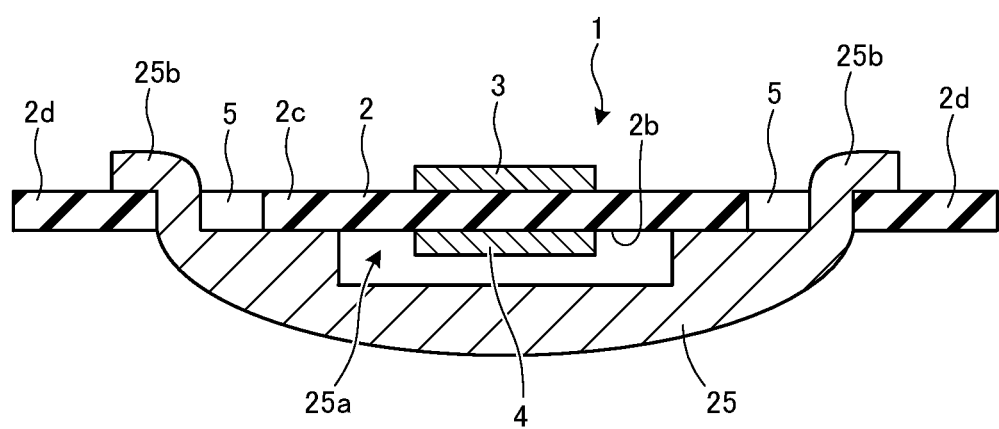
FIG. 6 is a cross-sectional view taken along a line B-B of FIG. 5A to illustrate the flow sensor.

FIGS. 5A and 5B are partial perspective views illustrating a flow sensor provided with a lid according to an embodiment of the invention. FIG. 6 is a cross-sectional view taken along the line B-B of the flow sensor of FIG. 5A. FIG. 5A is perspective view as seen from the front face side of the flow sensor 1, and FIG. 5B is a perspective view as seen from the back face side of the flow sensor 1.

According to this embodiment, as illustrated in FIGS. 5A, 5B, and 6, a lid 25 is provided on the back face 2b of the insulation board 2. As illustrated in FIG. 6, the lid 25 has a concave portion 25a. The lid 25 is provided on the back face of the flow sensor 1 such that the concave portion 25a is directed to the back face 2b side of the insulation board 2. As a result, the temperature compensation resistance element 4 arranged on the back face 2b of the insulation board 2 can be housed in the concave portion 25a.

According to this embodiment, the flow-rate detection resistance element 3 and the temperature compensation resistance element 4 are arranged inside the element mount portion 2c of the insulation board 2. For this reason, the lid 25 is provided on the back face of the element mount portion 2c to cover the surrounding of the element mount portion 2c. As illustrated in FIGS. 5A and 6, the lid 25 has a plurality of hook-like fastening portions 25b. In addition, the fastening portions 25b are fastened and fixed from the slit 5 to the front face of the support portion 2d. In this manner, by providing the lid 25 in the insulation board 2 so as to house the temperature compensation resistance element 4, it is possible to prevent the temperature compensation resistance element 4 from colliding with wind. In this case, the temperature compensation resistance element 4 is positioned inside the concave portion 25a of the lid 25 so as to maintain a contact state with the air by virtue of a thermal combination with the terminal 8 of the flow-rate detection resistance element 3. As a result, the temperature compensation resistance element 4 can detect a change of the surrounding temperature and maintain excellent sensitivity. In addition, in the configuration having the slit 5 as in this embodiment, the slit 5 can be used to install the insulation board 2. As illustrated in FIGS. 5A, 5B, and 6, the lid 25 can be simply installed on the back face of the element mount portion 2c. Alternatively, a ventilation hole communicating with the concave portion 25a from the front face of the lid 25 may be provided in the center or the like of the lid 25 without hermetically enclosing the concave portion 25a of the lid 25 that houses the temperature compensation resistance element 4. As a result, it is possible to obtain better performance.

Figure 7A:
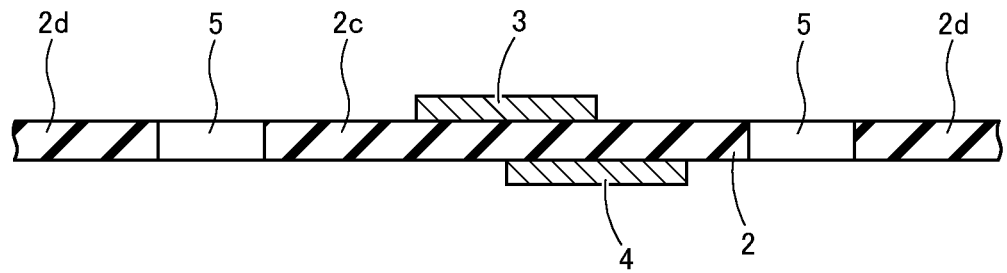
FIGS. 7A to 7C are partial cross-sectional views illustrating a flow sensor according another embodiment different from that of FIG. 2.
Figure 7B:
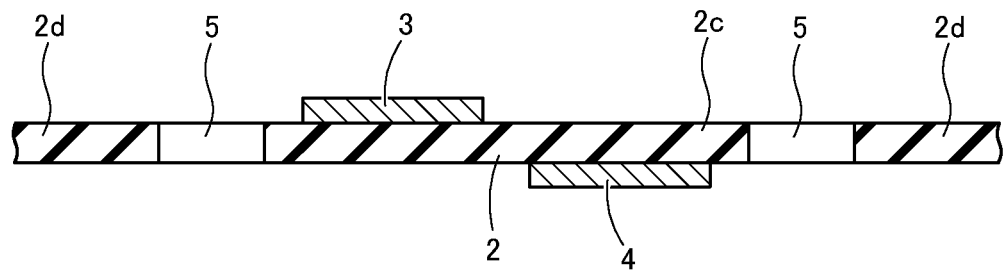
Figure 7C:
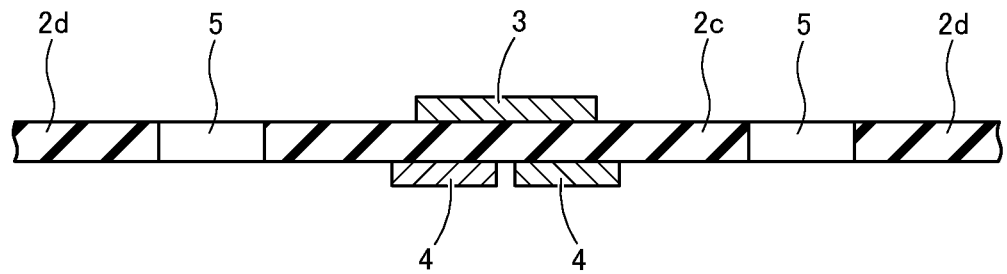

FIGS. 7A to 7C are partial cross-sectional views illustrating the flow sensor according to another embodiment different from that of FIG. 2. In FIG. 2, the temperature compensation resistance element 4 is arranged right under the flow-rate detection resistance element 3. In comparison, in FIG. 7A, the flow-rate detection resistance element 3 and the temperature compensation resistance element 4 are arranged to deviate in a lateral direction such that they are partially overlapped with each other on both front and back faces of the insulation board 2 by interposing the insulation board 2. Note that, as described above, the configuration of FIG. 7A is also included in the meaning of "arranged oppositely". Meanwhile, the flow-rate detection resistance element 3 and the temperature compensation resistance element 4 of FIG. 7B are separated from each other in the lateral direction of the insulation board 2 by interposing the insulation board 2 without overlapping.

According to this embodiment, the element mount portion 2c where the flow-rate detection resistance element 3 and the temperature compensation resistance element 4 are arranged is connected to the support portion 2d using the connecting portion 2e as illustrated in FIG. 1. As illustrated in FIG. 1, the width of the connecting portion 2e is sufficiently narrower than that of the element mount portion 2c, so that it serves as a region having a high thermal resistance. In a case where the element mount portion 2c and the support portion 2d are separated from each other, and the element mount portion 2c and the support portion 2d are connected to each other with the narrow-width connecting portion 2e in this manner, it is possible to reduce influence of the thermal resistance between the flow-rate detection resistance element 3 and the temperature compensation resistance element 4 even when the flow-rate detection resistance element 3 and the temperature compensation resistance element 4 are arranged separately without overlapping on the insulation board 2 inside the element mount portion 2c. According to this embodiment, for example, compared to a case where the flow-rate detection resistance element 3 is arranged in the element mount portion 2c, and the temperature compensation resistance element 4 is arranged in the support portion 2d, it is possible to reduce a thermal resistance between the flow-rate detection resistance element 3 and the temperature compensation resistance element 4 and allow the terminal temperature of the temperature compensation resistance element 4 to approach the terminal temperature of the flow-rate detection resistance element 3. Therefore, in a case where the flow-rate detection resistance element 3 and the temperature compensation resistance element 4 are arranged inside the element mount portion 2c as illustrated in FIG. 7B, it is possible to allow the terminal temperature of the temperature compensation resistance element 4 to approach the terminal temperature of the flow-rate detection resistance element 3 even when the flow-rate detection resistance element 3 and the temperature compensation resistance element 4 are arranged separately without overlapping on the insulation board 2. In addition, the heat capacity of the insulation board 2 serving as a region having the terminal temperature difference increases as both resistance elements are separated. However, an increase of the heat capacity can be suppressed as much as possible even if arranging both resistance elements to deviate from each other inside the limited space of the element mount portion 2c separated from the support portion 2d. As a result, using the configuration of FIG. 7B, it is possible to reduce the thermal time constant between both resistance elements and improve the responsiveness. However, by overlapping the flow-rate detection resistance element 3 and the temperature compensation resistance element 4 with each other by interposing the insulation board 2 as illustrated FIGS. 2 and 7A, it is possible to reduce the thermal time constant between the flow-rate detection resistance element 3 and the temperature compensation resistance element 4 and more effectively improve the responsiveness.

Although a single temperature compensation resistance element 4 is arranged in the embodiment of FIG. 2, for example, a plurality of temperature compensation resistance elements 4 may also be provided as illustrated in FIG. 7C, so that a predetermined resistance value is obtained from a plurality of temperature compensation resistance elements 4. In this case, if each temperature compensation resistance element 4 is arranged symmetrically with respect to the center of the flow-rate detection resistance element 3, it is possible to uniformly reduce the terminal temperature difference between the flow-rate detection resistance element 3 and the temperature compensation resistance element 4. Therefore, it is possible to stably improve the responsiveness.

In any one of the aforementioned embodiments, in order to suppress the temperature compensation resistance element 4 from colliding with wind, the temperature compensation resistance element 4 is arranged on the back face 2b of the insulation board 2. However, the temperature compensation resistance element 4 may also be arranged on the front face 2a of the insulation board 2 along with the flow-rate detection resistance element 3. In this case, the temperature compensation resistance element 4 may be arranged to avoid a wind blow compared to the flow-rate detection resistance element 3. For example, the flow-rate detection resistance element 3 may be arranged against the wind, and the temperature compensation resistance element 4 may be arranged to follow the wind. In this case, a windbreak wall for the temperature compensation resistance element 4 may be provided, or a configuration of FIGS. 8A and 8B may be employed.

Figure 8A:
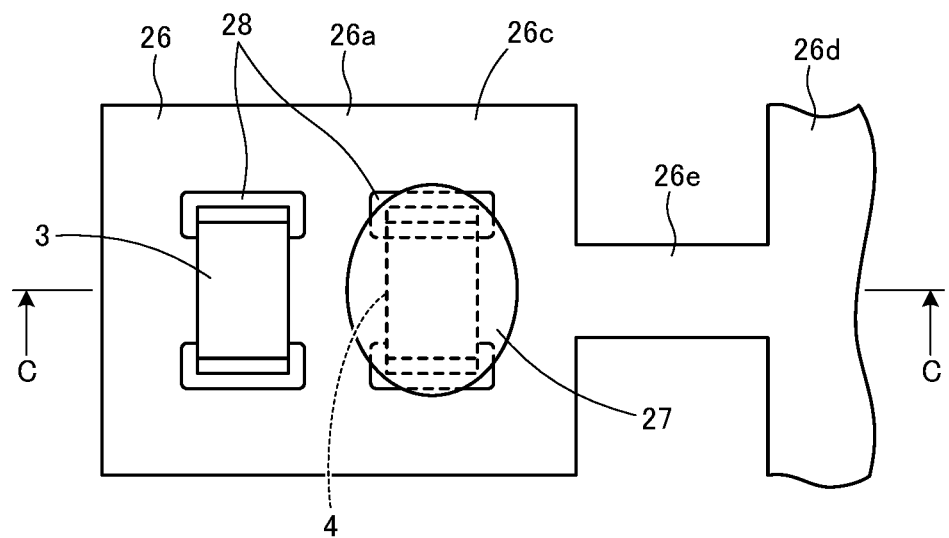
Figure 8B:
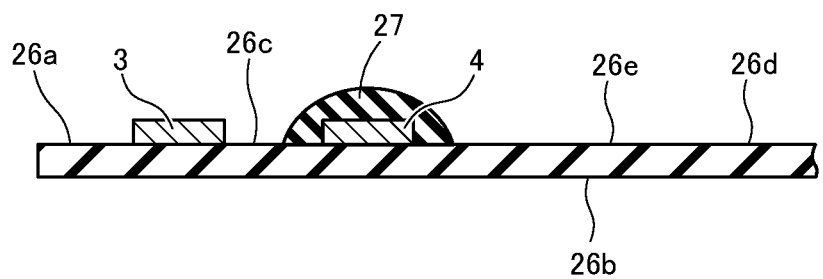

FIG. 8A is a plan view, and FIG. 8B is a cross-sectional view taken along the line C-C of FIG. 8A.

In the embodiment of FIGS. 8A and 8B, the insulation board 26 where the flow-rate detection resistance element 3 and the temperature compensation resistance element 4 are arranged includes an element mount portion 26c, a support portion 26d separated from the element mount portion 26c, and a narrow-width connecting portion 26e configured to connect the element mount portion 26c and the support portion 26d to each other. In addition, the flow-rate detection resistance element 3 and the temperature compensation resistance element 4 are arranged on the front face 26a of the element mount portion 26c. If the element mount portion 26c and the support portion 26d are connected to each other with the narrow-width connecting portion 26e as illustrated in FIGS. 8A and 8B, it is possible to reduce a thermal resistance between the flow-rate detection resistance element 3 and the temperature compensation resistance element 4 even when the flow-rate detection resistance element 3 and the temperature compensation resistance element 4 are arranged apart from each other inside the element mount portion 26c. Note that it is possible to reduce the terminal temperature difference between both resistance elements 3 and 4 as small as possible by appropriately adjusting the size or shape of the land 28 connected to the terminal of each resistance element 3 and 4 and an interval between the resistance elements 3 and 4

In the embodiment of FIGS. 8A and 8B, the front face of the temperature compensation resistance element 4 is covered by a heat insulation layer 27. As a result, it is possible to prevent the temperature compensation resistance element 4 from colliding with the wind.

However, in the configuration of FIGS. 8A and 8B, the temperature compensation resistance element 4 has a temperature reference at the back face 26b, and heat radiation from the flow-rate detection resistance element 3 to the air is set at the front face 26a. Thus, the positions of both resistance elements become apart. Therefore, the function of the temperature compensation resistance element 4 is degraded, compared to the aforementioned embodiment. For this reason, as illustrated in FIG. 2 and the like, the function of the temperature compensation resistance element 4 can be appropriately maintained by arranging the temperature compensation resistance element 4 on the back face 2b of the insulation board 2, setting the temperature reference of the temperature compensation resistance element 4 at the front face 2a, exposing the temperature reference of the temperature compensation resistance element 4 to the external air side making contact with the flow-rate detection resistance element 3, and suppressing the temperature compensation resistance element 4 from colliding with the air. Alternatively, instead of the configuration of FIGS. 8A and 8B, the temperature compensation resistance element 4 may be arranged on the front face of the insulation board 2 along with the flow-rate detection resistance element 3, and a lid having a cavity may be covered on the temperature compensation resistance element 4 if space is allowed.

Note that, as the configuration of the insulation board, the insulation board 2 of FIG. 1 is more desirable than the insulation board 26 of FIGS. 8A and 8B. Specifically, it is possible to improve a mechanical strength of the element mount portion 2c, compared to the element mount portion 26c of FIGS. 8A and 8B, by surrounding the element mount portion 2c with the support portion 2d and connecting the element mount portion 2c and the support portion 2d by a plurality of connecting portions 2e as in the insulation board 2 of FIG. 2. Note that a single connecting portion 2e may also be employed although the mechanical strength of the element mount portion 2c is degraded in FIG. 1. However, since the connecting portion 2e is also a region for forming the wiring pattern 15 as illustrated in FIG. 1, it is possible to simply extend a plurality of wiring patterns 15 from the element mount portion 2c to the support portion 2d by providing a plurality of connecting portions 2e similar to a plurality of wiring patterns 15 as illustrated in FIG. 1.

Although the flow sensor 1 according to this embodiment is a wind velocity sensor in the aforementioned description, the flow sensor 1 is not limited to the wind velocity sensor. This embodiment may also apply to a sensor for fluid other than the wind such as gases or liquid such as water. In the case of the liquid, if the flow sensor has the configuration of FIGS. 5A and 5B or FIGS. 8A and 8B, it is possible to prevent the temperature compensation resistance element 4 from making contact with the liquid. In addition, it is possible to appropriately detect a flow velocity of the liquid with excellent responsiveness while maintaining sensitivity.

Features of this embodiment will be described below in summary. The flow sensor according to this embodiment includes the insulation board, the flow-rate detection resistance element, and the temperature compensation resistance element. The flow-rate detection resistance element and the temperature compensation resistance element are arranged on the insulation board such that the terminal temperature of the temperature compensation resistance element approaches the terminal temperature of the flow-rate detection resistance element. As a result, it is possible to reduce the thermal time constant between both resistance elements and improve responsiveness.

The flow sensor according to this embodiment includes the insulation board, the flow-rate detection resistance element, and the temperature compensation resistance element. The flow-rate detection resistance element is arranged on the front face side of the insulation board, and the temperature compensation resistance element is arranged on the back face side of the insulation board oppositely to the flow-rate detection resistance element by interposing the insulation board. In this manner, since the flow-rate detection resistance element and the temperature compensation resistance element are arranged oppositely on front and back faces of the insulation board, it is possible to allow the terminal temperature of the temperature compensation resistance element to approach the terminal temperature of the flow-rate detection resistance element and reduce the thermal time constant between both resistance elements. Therefore, it is possible to improve responsiveness.

According to this embodiment, the temperature compensation resistance element is preferably arranged such that a contact with fluid is obstructed, compared to the flow-rate detection resistance element. The heat radiated from the heated flow-rate detection resistance element is transferred to the insulation board, so that the temperature of the temperature compensation resistance element increases. For this reason, if the temperature compensation resistance element makes contact with the fluid, a temperature of the temperature compensation resistance element itself easily changes, and sensitivity is degraded. Therefore, by arranging the temperature compensation resistance element so as not to make contact with the fluid according to the present invention, it is possible to improve responsiveness while maintaining sensitivity.

According to this embodiment, the insulation board includes the element mount portion, the support portion separated from the element mount portion, and the connecting portion configured to connect the element mount portion and the support portion to each other and have a width narrower than that of the element mount portion. The flow-rate detection resistance element and the temperature compensation resistance element are preferably arranged inside the element mount portion. According to the present invention, the thermal resistance is high in the narrow-width connecting portion. In addition, by arranging the flow-rate detection resistance element and the temperature compensation resistance element inside the element mount portion connected to the connecting portion having a high thermal resistance separately from the support portion, it is possible to reduce the thermal resistance between both resistance elements and allow the terminal temperature of the temperature compensation resistance element to appropriately approach the terminal temperature of the flow-rate detection resistance element. As a result, it is possible to reduce the thermal time constant between both resistance elements and improve responsiveness.

According to this embodiment, the support portion surrounds the element mount portion by interposing the slit, and the element mount portion and the support portion are preferably connected to each other by a plurality of connecting portions. As a result, it is possible to improve a mechanical strength of the element mount portion.

According to this embodiment, it is preferable that the lid having the concave portion is provided on the back face of the element mount portion, and the temperature compensation resistance element is arranged inside the concave portion on the back face of the element mount portion. As a result, it is possible to more suitably prevent the temperature compensation resistance element from making contact with fluid. In this case, the temperature compensation resistance element can maintain a contact state with the external air (air). Therefore, it is possible to maintain excellent sensitivity. Furthermore, in the configuration having the slit, the lid can be coupled to the insulation board using the slit. Therefore, it is possible to simply install the lid on the back face of the element mount portion.

According to this embodiment, it is preferable that the flow-rate detection resistance element and the temperature compensation resistance element includes a ceramic substrate, a resistor layer provided on the front face of the ceramic substrate, and a terminal electrically connected to the resistor layer and provided on the front face of the ceramic substrate. The flow-rate detection resistance element and the temperature compensation resistance element according to the present invention are chip type resistors having the ceramic substrate, the resistor layer, and the terminal. According to the present invention, since chip type resistors as the flow-rate detection resistance element and the temperature compensation resistance element are arranged on the insulation board, it is possible to effectively improve responsiveness.

Examples

The present invention will now be described in details with regard to examples for clarifying the effects of the present invention. Note that the invention is not limited by the following examples.

<Experiment on Terminal Temperature Difference>

First, in this experiment, temperatures of each part of the flow sensor were measured for the flow sensors of Example and Comparative Example described below to compare the terminal temperature difference between the flow-rate detection resistance element and the temperature compensation resistance element.

Example

Figure 9A:
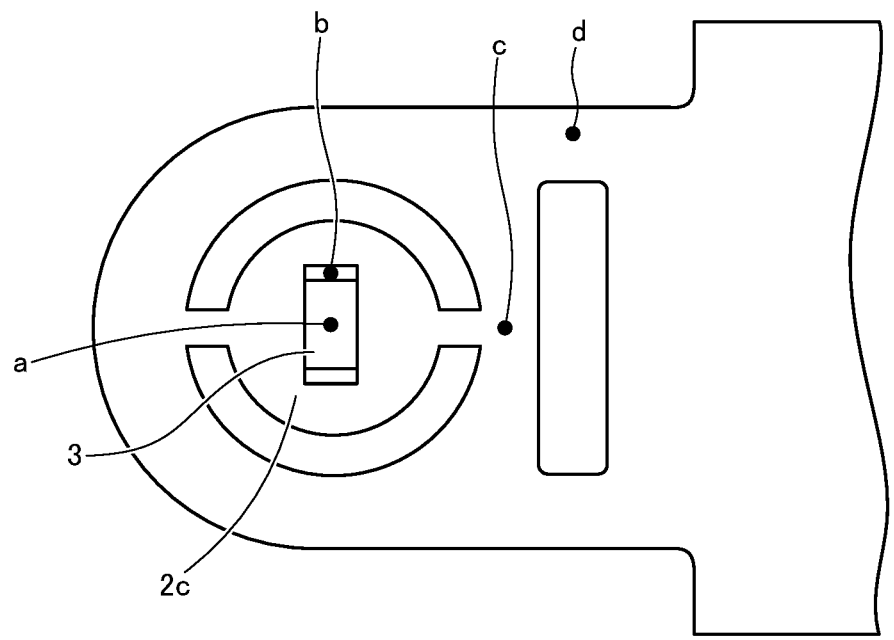
FIG. 9A is a plan view illustrating an example used in an experiment.
Figure 9B:
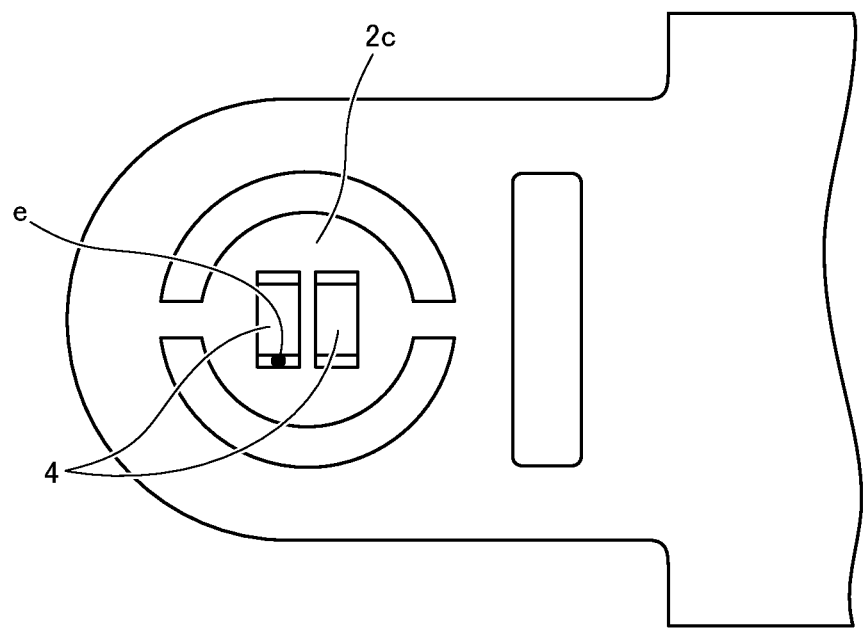
FIG. 9B is a rear view illustrating the example.

FIG. 9A is a plan view and FIG. 9B is a rear view illustrating a flow sensor in Example used in an experiment. As illustrated in FIG. 9A, a single flow-rate detection resistance element 3 is arranged on a front face of an element mount portion 2c. As illustrated in FIG. 9B, a pair of temperature compensation resistance elements 4 are arranged on a back face of the element mount portion 2c. Note that a configuration of the insulation board of FIGS. 9A and 9B is similar to that of the insulation board 2 of FIG. 1.

Comparative Example

Figure 10A:
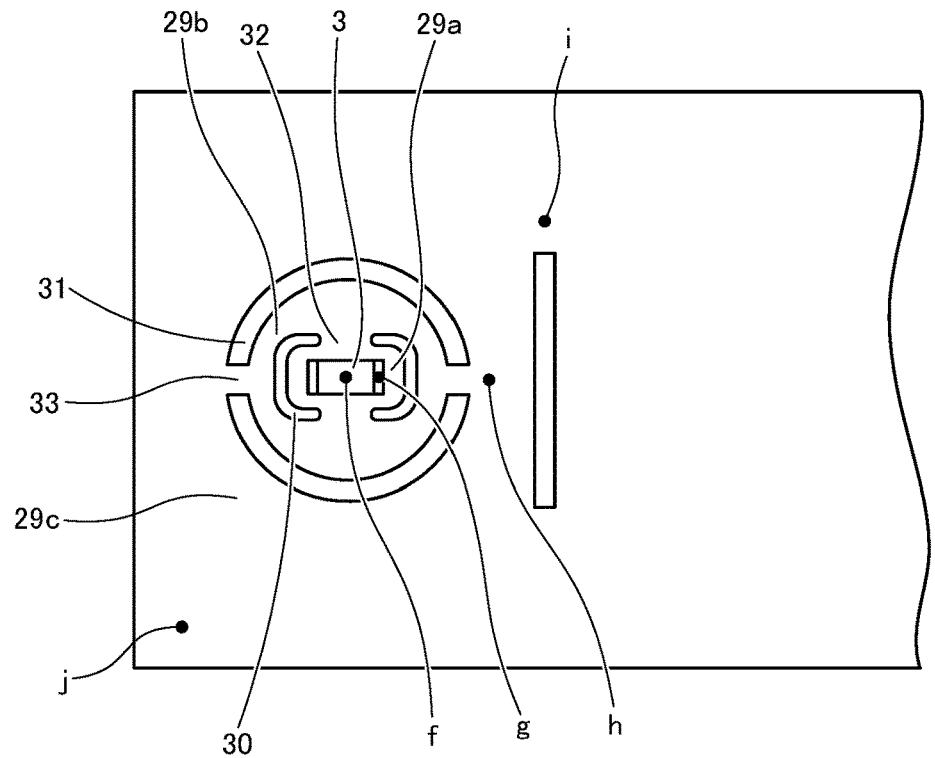
FIG. 10A is a plan view illustrating a comparative example used in an experiment.
Figure 10B:
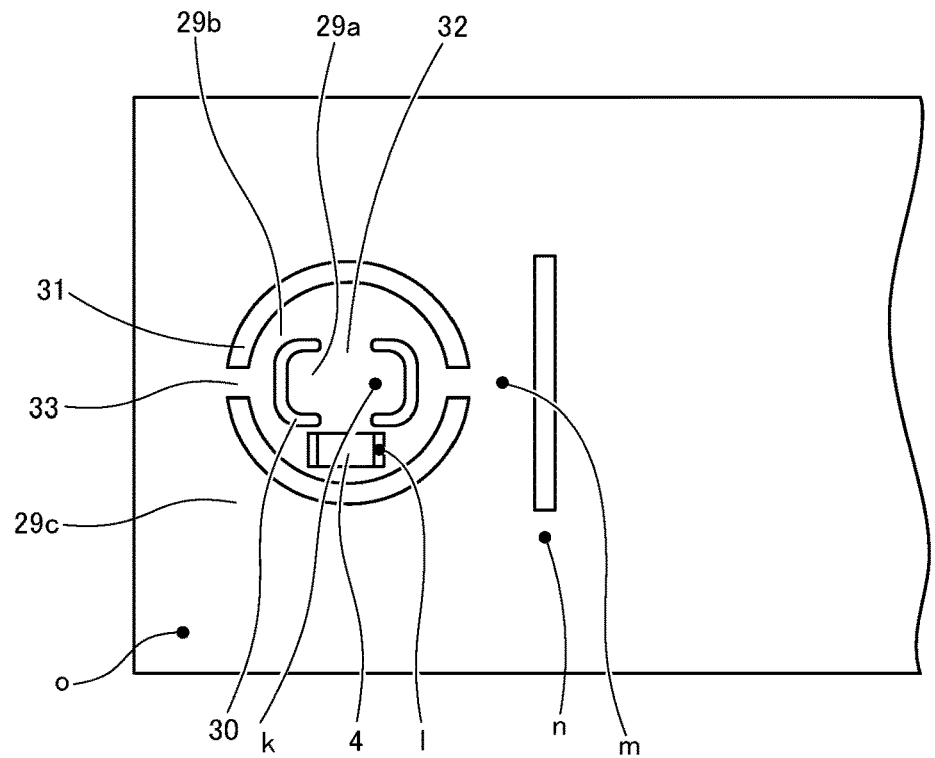
FIG. 10B is a rear view illustrating the comparative example.

FIG. 10A is a plan view and FIG. 10B is a rear view illustrating a flow sensor of Comparative Example used in an experiment. As illustrated in FIGS. 10A and 10B, the insulation board has a shape different from that of FIGS. 9A and 9B. That is, as illustrated in FIGS. 10A and 10B, the insulation board includes a center portion 29a, a peripheral portion 29b, and a support portion 29c separated by slits 30 and 31. The center portion 29a and the peripheral portion 29b are connected to each other with a narrow-width connecting portion 32, and the peripheral portion 29b and the support portion 29c are connected to each other with a narrow-width connecting portion 33.

As illustrated in FIG. 10A, a single flow-rate detection resistance element 3 is provided on the front face of the center portion 29a. As illustrated in FIG. 10B, a single temperature compensation resistance element 4 is arranged on the back face of the peripheral portion 29b.

In both Example and Comparative Example, the same flow-rate detection resistance element 3 and the same temperature compensation resistance element 4 were employed. As the flow-rate detection resistance element 3 and the temperature compensation resistance element 4, chip type resistors produced by KOA Corporation were employed as illustrated in FIG. 3. In addition, as the insulation board, a FR-4 board having the same thickness was employed in both Example and Comparative Example. Furthermore, the circuit configuration of FIG. 4 was employed in both Example and Comparative Example. In a windless state, the flow-rate detection resistance element 3 as a heat-radiating resistor was heated by driving the circuit such that the temperature compensation resistance element 4 has a predetermined resistance value Rs2 at a temperature of 25° C., and the flow-rate detection resistance element 3 has a predetermined resistance value Rs1 at a temperature higher than that of the temperature compensation resistance element 4. In addition, the resistance value Rs2 was controlled to approximately ten times of the resistance value Rs1.

<Method of Experiment>

Temperatures at points "a" to "d" of the front face side of FIG. 9A and a point "e" of the back face side of FIG. 9B were measured using infrared thermography. The point "a" (front) is positioned in the center of the flow-rate detection resistance element 3. The point "b" (front) is a terminal position of the flow-rate detection resistance element. The points "c" (front) and "d" (front) are positioned in branch portions of the insulation board. In addition, the point "e" (back) is a terminal position of the temperature compensation resistance element.

Similarly, temperatures at points "f" to "j" of the front face side of FIG. 10A and points "k" to "o" of the back face side of FIG. 10B were measured using infrared thermography. The point "f" (front) is positioned in the center of the flow-rate detection resistance element 3. The point "g" (front) is a terminal position of the flow-rate detection resistance element. The points "h" (front) and "i" (front) are positioned in branch portions of the insulation board. In addition, the point "j" (front) is positioned in the vicinity of a leading edge of the insulation board. The point "k" (back) is a position on the insulation board oppositely to the terminal of the temperature compensation resistance element. The point "l" (back) is positioned in the terminal of the temperature compensation resistance element. The points "m" (back) and "n" (back) are positioned in branch portions of the insulation board. In addition, the point "o" (back) is positioned in the vicinity of a leading edge of the insulation board.

In the following experiment method, temperatures of each point were measured.
 Measurement Environment
  room temperature: 25° C. (temperature management for 24 hours)
 Measurement Method
  treatment for front face of sample: a spray coat was applied to the entire airflow sensor (wind velocity sensor) at emissivity of 0.98.
  measurement condition: measurement of the airflow sensor was performed under an environment where no wind collides.
  measurement device: infrared thermography device, Model No. TH9260 (2007) produced by Nippon Avionics Co., Ltd.
  employed lens: TH92-486
 (with a standard lens having a minimum resolution of 100 μm by 100 μm and a focal distance of 195 mm)

A temperature measurement result for each point will be provided in the following description. Table 1 shows an experimental result for Example, and Table 2 shows an experimental result for Comparative Example. Note that the "temperature increase value" of Tables 1 and 2 refers to a temperature difference from the room temperature of 25° C.

TABLE 1

| | Measurement point | Temperature [° C.] | Temperature increase value [° C.] |
|---|---|---|---|
| a (front) | flow-rate detection resistance element (center) | 51.1 | 26.1 |
| b (front) | terminal of flow-rate detection resistance element | 43.3 | 18.3 |
| c (front) | insulation board (branch portion) | 35.9 | 10.9 |
| d (front) | insulation board (branch portion) | 30.7 | 5.7 |
| e (back) | terminal of temperature compensation resistance element | 42.2 | 17.2 |

TABLE 2

| | Measurement point | Temperature [° C.] | Temperature increase value [° C.] |
|---|---|---|---|
| f (front) | flow-rate detection resistance element (center) | 42.9 | 17.9 |
| g (front) | terminal of flow-rate detection resistance element | 42.0 | 17.0 |
| h (front) | insulation board (branch portion) | 35.0 | 10.0 |
| i (front) | insulation board (branch portion) | 32.6 | 7.6 |
| j (front) | insulation board (vicinity of leading edge) | 29.9 | 4.9 |
| k (back) | insulation board (position opposite to terminal of flow-rate | 40.2 | 15.2 |

TABLE 2-continued

| | Measurement point | Temperature [° C.] | Temperature increase value [° C.] |
|---|---|---|---|
| | detection resistance element) | | |
| l (back) | terminal of temperature compensation resistance element | 36.9 | 11.9 |
| m (back) | insulation board (branch portion) | 35.0 | 10.0 |
| n (back) | insulation board (branch portion) | 32.6 | 7.6 |
| o (back) | insulation board (vicinity of leading edge) | 29.9 | 4.9 |

As shown in Table 1, it was recognized that the flow-rate detection resistance element 3 has a terminal temperature of 43.3° C., the temperature compensation resistance element 4 has a terminal temperature of 42.2° C., and the terminal temperature difference is approximately 1° C.

Meanwhile, in Comparative Example, the flow-rate detection resistance element 3 had a terminal temperature of 42.0° C. In addition, the temperature compensation resistance element 4 had a terminal temperature of 36.9° C. Therefore, the terminal temperature difference of Comparative Example was approximately 5° C.

<Experiment of Responsiveness>

Subsequently, an experiment was performed for responsiveness using each flow sensor of Example and Comparative Example described above.

In this experiment, wind was blown using a fan to the front face side of each flow sensor of Example and Comparative Example under the aforementioned measurement environment. In this case, each flow sensor of Example and Comparative Example was arranged side by side to simultaneously blow wind continuously several times using a fan, and the wind velocity was measured using each flow sensor. A result of the experiment is shown in FIG. 11.

Figure 11:
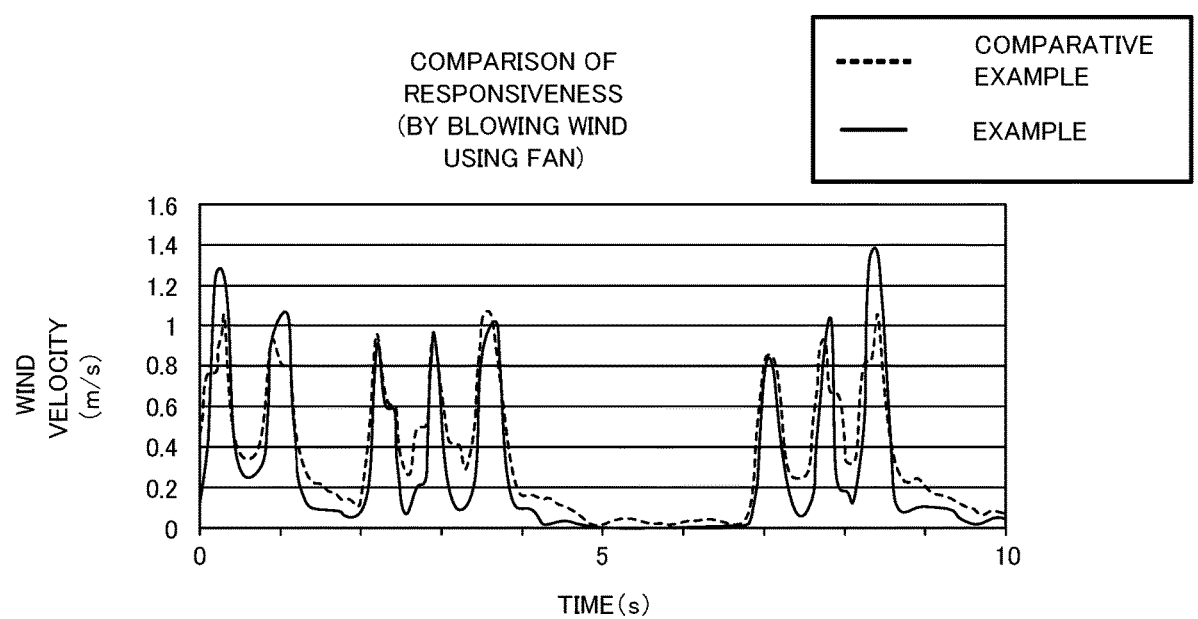
FIG. 11 is a graph illustrating responsiveness to a wind velocity in the example and the comparative example.

Peaks of each waveform of FIG. 11 indicate moments at which the wind is strongest when the wind is blown using a fan. As illustrated in FIG. 11, it was recognized that rising edges and falling edges of the waveform of Example are steeper than those of Comparative Example. That is, sharp peaks were detected in the case of Example rather than Comparative Example. In this manner, in Example, each peak is appropriately separated in an easily distinguishable state. Therefore, it was recognized that "a response is fast" or "a temporal resolution is higher" in the case of Example, compared to Comparative Example.

In this manner, in Example having a smaller terminal temperature difference between the flow-rate detection resistance element 3 and the temperature compensation resistance element 4, it is possible to improve responsiveness, compared to Comparative Example.

The flow sensor according to the present invention may be employed, for example, as a wind velocity sensor capable of detecting a wind velocity. The flow sensor is applicable to various applications that can change color or brightness of LEDs, change a sound volume or a melody, change an image or the like depending on the wind velocity. The application using the flow sensor according to the present invention may be employed in an IOT-based sensor network by way of example.

The flow sensor according to the present invention may be mounted on a vehicle, an electronic device or the like, and may be employed in a thermal airflow meter or the like.

In particular, according to the present invention, it is possible to detect a wind velocity with high accuracy while suppressing a manufacturing cost. Therefore, it is possible to implement a dynamic presentation with excellent responsiveness depending on a wind velocity while suppressing a manufacturing cost for the aforementioned application. Accordingly, it is possible to provide a sense of fun, entertainment, exhilaration, stimulation, and the like to users or onlookers.

This application is based on and claims priority to Japanese Patent Application Laid-open No. 2016-088070, filed on Apr. 26, 2016, the entire content of which is incorporated herein by reference.

The invention claimed is:

1. A flow sensor comprising:
   an insulation board;
   a flow-rate detection resistance element; and
   a temperature compensation resistance element,
   wherein the arrangement of each of the flow-rate detection resistance element and the temperature compensation resistance element on the insulation board is such that a terminal temperature of the temperature compensation resistance element approaches a terminal temperature of the flow-rate detection resistance element,
   wherein the insulation board has an element mount portion, a support portion separated from the element mount portion, and a connecting portion configured to connect the element mount portion and the support portion to each other and to have a width narrower than that of the element mount portion, and
   wherein each of the flow-rate detection resistance element and the temperature compensation resistance element is arranged inside the element mount portion.

2. A flow sensor comprising:
   an insulation board;
   a flow-rate detection resistance element; and
   a temperature compensation resistance element,
   wherein the flow-rate detection resistance element is arranged on a front face side of the insulation board,
   wherein the temperature compensation resistance element is arranged on a back face side of the insulation board oppositely from the flow-rate detection resistance element by interposing the insulation board therebetween,
   wherein the insulation board has an element mount portion, a support portion separated from the element mount portion, and a connecting portion configured to connect the element mount portion and the support portion to each other and to have a width narrower than that of the element mount portion, and
   wherein each of the flow-rate detection resistance element and the temperature compensation resistance element is arranged inside the element mount portion.

3. The flow sensor according to claim 1, wherein the temperature compensation resistance element is arranged such that a contact with fluid is obstructed, compared to the flow-rate detection resistance element.

4. The flow sensor according to claim 1, wherein the support portion surrounds the element mount portion by interposing a slit therebetween, and
   the element mount portion and the support portion are connected to each other by a plurality of the connecting portions.

5. The flow sensor according to claim 1, further comprising a lid arranged on a back face of the element mount portion and provided with a concave portion, wherein the temperature compensation resistance element is arranged inside the concave portion on the back face of the element mount portion.

6. The flow sensor according to claim 1, wherein the flow-rate detection resistance element and the temperature compensation resistance element have a ceramic substrate, a resistor layer provided on a front face of the ceramic substrate, and a terminal electrically connected to the resistor layer and provided on a front face of the ceramic substrate.

* * * * *